(12) United States Patent
Akkanen et al.

(10) Patent No.: US 7,193,970 B2
(45) Date of Patent: Mar. 20, 2007

(54) PROTECTED ROUTING IN A COMMUNICATION NETWORK

(75) Inventors: Jyrki Akkanen, Espoo (FI); Jukka Nurminen, Espoo (FI)

(73) Assignee: Nokia Corporation, Espoo (FI)

( * ) Notice: Subject to any disclaimer, the term of this patent is extended or adjusted under 35 U.S.C. 154(b) by 882 days.

(21) Appl. No.: 10/042,671

(22) Filed: Jan. 9, 2002

(65) Prior Publication Data

US 2002/0060987 A1 May 23, 2002

Related U.S. Application Data

(63) Continuation of application No. PCT/FI01/00402, filed on Apr. 26, 2001.

(30) Foreign Application Priority Data

May 31, 2000 (FI) .................................. 20001317

(51) Int. Cl.
*H04J 1/16* (2006.01)

(52) U.S. Cl. ...................... 370/238; 370/351; 709/221; 709/241

(58) Field of Classification Search ................ 370/237, 370/238, 351, 248, 395.21, 400; 709/241
See application file for complete search history.

(56) References Cited

U.S. PATENT DOCUMENTS

| | | | |
|---|---|---|---|
| 5,559,625 A * | 9/1996 | Smith et al. ................... 398/66 |
| 5,841,664 A | 11/1998 | Cai et al. | |
| 5,953,337 A | 9/1999 | Almay | |
| 5,999,286 A | 12/1999 | Venkatesan | |
| 6,047,331 A | 4/2000 | Medard et al. | |
| 6,530,032 B1 * | 3/2003 | Shew et al. ..................... 714/4 |
| 6,564,258 B1 * | 5/2003 | Uniacke ..................... 709/223 |
| 6,704,320 B1 * | 3/2004 | Narvaez et al. ............. 370/408 |
| 6,735,393 B1 * | 5/2004 | Zouganeli ..................... 398/48 |
| 6,901,048 B1 * | 5/2005 | Wang et al. ................ 370/228 |
| 6,940,808 B1 * | 9/2005 | Shields et al. .............. 370/216 |

FOREIGN PATENT DOCUMENTS

| FI | 20001317 | 5/2000 |
|---|---|---|
| WO | 95/07586 | 3/1995 |

OTHER PUBLICATIONS

Akkanen et al, A case study of the evolution of routing algorithm in a network planning tool, ACM, pp. 181-198, 2001.*

* cited by examiner

*Primary Examiner*—Frank Duong
(74) *Attorney, Agent, or Firm*—Squire, Sanders & Dempsey L.L.P.

(57) ABSTRACT

This invention relates to routing in a communication network. The invention offers a method to make a protected routing through all the layers of a communication network. The bottom layer is the foundation for all protected routes. The routing order is from bottom to top. First, the first layer above the bottom layer is routed into the bottom layer. The links which do not need protection can be routed via the shortest path. The links which need protection are routed in a way that there exist two, as short as possible, separate paths. The other links are routed in a similar way. Finally the top layer is routed into the layer below the top layer.

10 Claims, 4 Drawing Sheets

PROTECTED ROUTING IN A COMMUNICATION NETWORK

This application is a continuation of international application Serial. No. PCT/FI01/00402, filed 26 Apr. 2001.

FIELD OF THE INVENTION

This invention relates to routing in a communication network. In particular, the invention concerns routing in telecommunication and cellular networks. Generally, the term routing describes choosing a data stream path (connection) between two endpoints. In this text routing also means a process to route the whole network or a specific network part, i.e. to route all data streams in a network or in a specific network part.

BACKGROUND OF THE INVENTION

The routing process of a network is not a simple task. It is convenient to think of a network as layers on top of one another, each layer representing a specific task area of the network (FIG. 1). Each layer comprises nodes and transmission links which are needed to represent the function of the layer. Often transmission links are called edges as in this text as well. Usually the top layer (1) describes logical connections of the network, how a single node (for example a base station) sees the network, i.e. transparent connections. Correspondingly, the bottom layer describes the physical network (2), where nodes and real transmission lines have been located. Between the top and the bottom layers there are several sublayers (3), each of them representing either the logical or physical network of a specific technology, such as 2 Mbit/s frame connections. The route for a connection in a layer under review must always be found in the layer below. So, the routes for the logical layer connections must be found in the layer below, and connections of this layer must have routes in the layer below this layer, and so on. Finally, all connections have routes in the bottom layer.

If a connection is desired to be protected, two separate routes must be found between endpoints of the connection. Sometimes it happens that the routing from the layer above to the layer below fails, i.e. both routes go through the same edge, as the situation is in FIG. 2. The left ring shows a situation where two connections between nodes A and B go through the same edges, when there is no spare route for either one of the connections. If protection is desired to be a real all-time protection, then both connections must carry the same signal. The right ring shows a situation where the connections go through separate edges all the way between nodes A and B. Usually, a protection switch is located in the endpoints (A and B in FIG. 2) where a protected route (two separate connections) start and end. The protection switch splits the signal of the connection into two signals. Taking into account the above-mentioned matters, protected connections must be routed through all layers in a way that there exist two separate physical routes between endpoints.

The objective of the invention is to make it possible to create protected connections through all layers, eliminating the above-mentioned drawback. This is achieved in a way described in the claims.

SUMMARY OF THE INVENTION

The invention offers a method to make a protected routing through all the layers of a communication network. The bottom layer is the foundation for all protected routes. The routing order is from bottom to top. First, the first layer above the bottom layer is routed into the bottom layer. The links which do not need protection can be routed via the shortest path. The links which need protection are routed in a way that there exist two, as short as possible, separate paths. Protection demands are in the links, in the first layer above the bottom layer.

Second, the second layer above the bottom layer is routed into the first layer above the bottom layer. The links which do not need protection can be routed in the shortest path. The links which need protection are routed in a way that there exist two, as short as possible, separate paths. Protection demands are in the links, in the second layer above the bottom layer. The first routing from the first layer to the bottom layer has to be taken into account for separating already protected routes in the first layer from the unprotected routes. If the routing from the second layer to the first layer fails to satisfy protection demands totally or partly, the routing from the first layer to the bottom layer can be corrected by taking into account the demands of the second layer which are known in more detail now. The repeated routing makes it possible to change routes concerning the whole network, or only the network part where there is difficulties to satisfy routing requirements coming from the second layer. After the corrected routing from the first to the bottom layer, the routing from the second to the first layer can be corrected as well, taking into account the repeated routing below. This iteration can be done several times.

Third, the third layer above the bottom layer is routed into the second layer above the bottom layer. The links which do not need protection can be routed in the shortest path. The links which need protection are routed in a way that there exist two, as short as possible, separate paths. Protection demands are in the links, in the third layer above the bottom layer. The second routing from the second layer to the first layer and the first routing from the first layer to the bottom layer has to be taken into account for separating already protected routes in the first and second layers from the unprotected routes.

If the routing from the third layer to the second layer fails to satisfy protection demands totally or partly, the routing from the second layer to the first layer can be corrected by taking into account the demands (which are known in more detail now) of the third layer. And if needed, the routing from the first layer to the bottom layer can be corrected as well. After the repeated routings in the layers below, the routing from the third to the second layer can be corrected. This iteration can be done several times.

In that way the routing process moves from bottom to up. Finally the top layer is routed in the same way as the layers above the bottom layer. The protected routes through all the layers have been created.

BRIEF DESCRIPTION OF THE DRAWINGS

In the following the invention is described in more detail by means of FIGS. 1–7 in the attached drawings where.

DETAILED DESCRIPTION OF THE INVENTION

Figure 1:
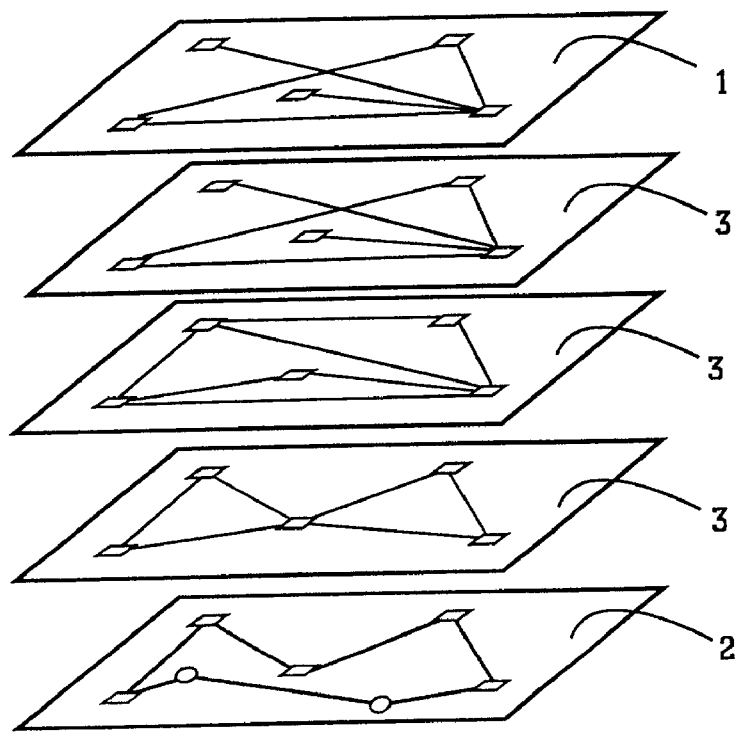
FIG. 1 illustrates an example of a communication network divided into several layers on top of one another, each layer representing a specific task area of the network.
Figure 2:
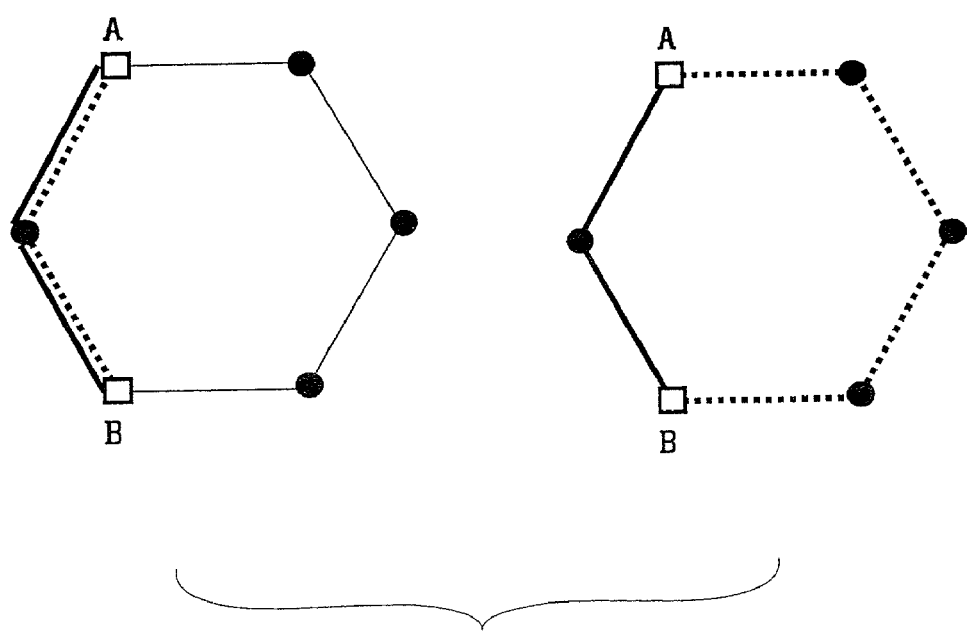
FIG. 2 shows an example of a path when protection has failed, and when protection is working properly.
Figure 3A:
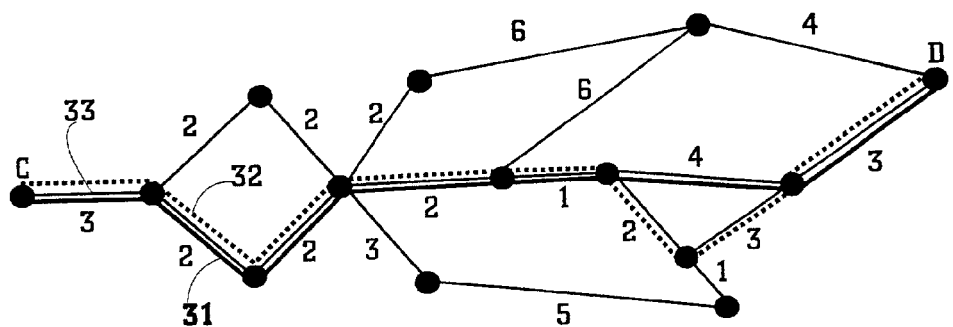
FIGS. 3A and 3B shows an example of how to route two separate connections between the endpoints.
Figure 3B:
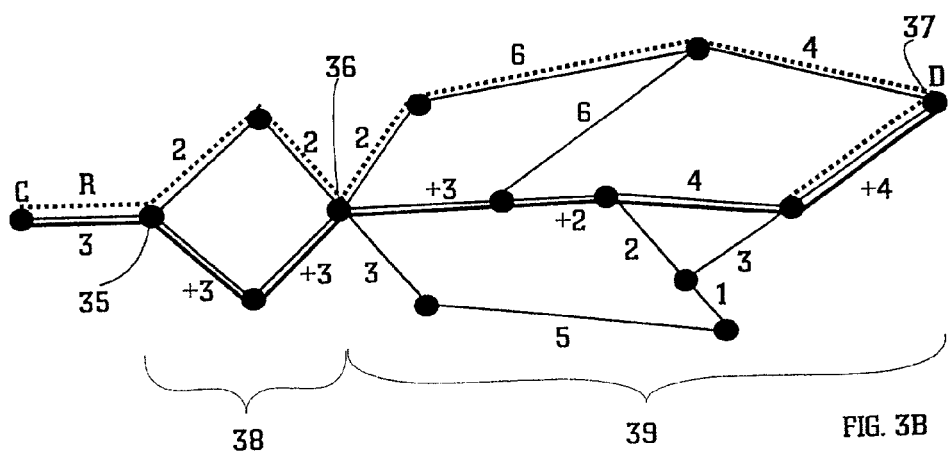

For helping the understanding of the description of the invention, FIGS. 3A and 3B examples of the terms used. A link is a transmission line (33) between two nodes in a network. A route (or a connection) is the connection (31) between two endpoints in a network. The route can contain several links. A route section (38) is the part of a route. Sometimes it is useful to examine the route section, which contain one or more links. A bath corresponds to a route. The bath can also be a route inside a route section (39), i.e. the connection through a route section. It is worth noting that these terms overlap with each other, depending on the needs for describing a certain matter.

FIGS. 3A and 3B show an example of how to route two separate connections between the endpoints. The weight, which represents a length, of each edge has been marked beside the edge. The task is to find the shortest protected route from endpoint C to endpoint D. There exist many algorithms to find out the single shortest route and they are out of the inventive idea. But the question is, how to find two separate routes between the endpoints? FIG. 3A illustrates the two shortest routes between endpoints C and D. The shortest has been marked in a solid line (31) and the second shortest in a dashed line (32). It can be noticed that common route sections (paths) exist.

Let's take a penalty weight into use. By adding the penalty weight to the weight of the edge which carries two or more connections through it, it is possible to increase the length of the edge. So in a case such as in FIG. 3A where there are two connection with common paths, first either one of the connections (preferably the shortest one) is fixed. The lengths of common edges are increased by the penalty weight. In this case, the penalty weight is 1. After using the penalty weights, a new shortest connection is found. FIG. 3B illustrates the situation after finding the new shortest connection. The edge weights where the penalty weight has been used have been marked with +.

Penalty weights do not need to be the same value for all edges. The penalty weight can be edge specific. The edge (33) right after endpoint C in FIG. 3 is the only path in that route section. The path can be reliable so it does not need protection, or the path can be unreliable so the only choice is to be satisfied with the situation. Either way, It is reasonable to set the penalty weight at zero for that edge. Depending on the network section, the user can set up penalty weights of the edges inside the section.

Let's assume that the path (33) right after endpoint C in FIG. 3 is reliable. So it can be marked (R) into the topology of this layer. The path (33) could also be assumed to be protected, i.e. there are two separate routes for the path (33) in the layer below. Usually, protection switches are at the endpoints (35,36,37) of the protected section (38,39), but the switches can also be before the paths separate (for example in C). In other words, two connections of the protected route can be parallel in the same edge, or in the same path for a while over a specific route section (such as the path (33) in FIG. 3). This kind of route section should preferably be reliable. To sum up, there can be unprotected, reliable and protected route sections in a layer.

Figure 4:
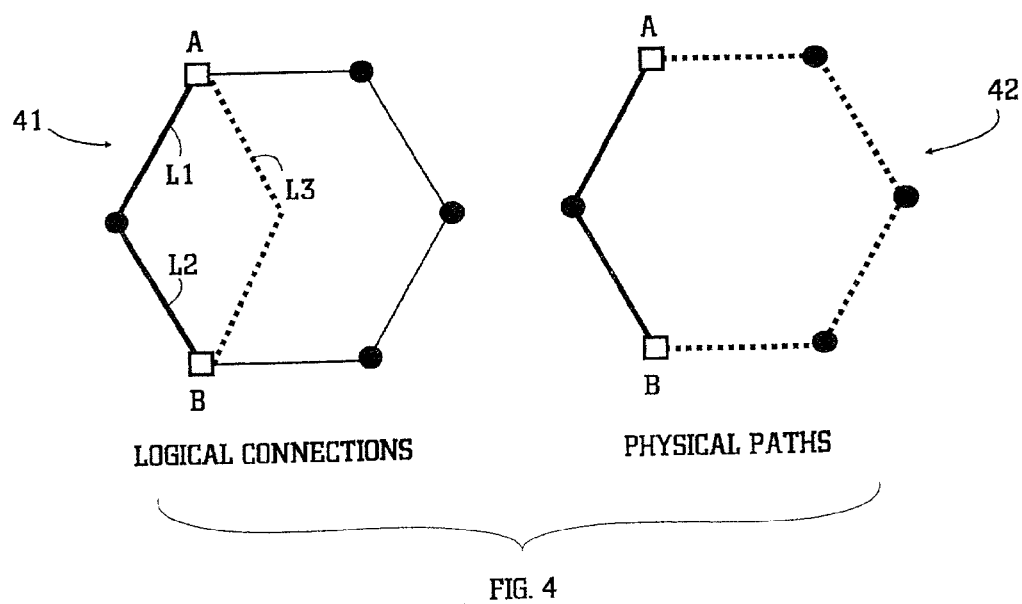
FIG. 4 illustrates an example of the requirement for a protected route from the logical layer to the physical layer.

When routing a layer to the layer below, protection requirements must be found. The layer itself can contain some requirements, other requirements can come from the layer above. FIG. 4 illustrates an example of the requirement for the protected route from the logical layer to the physical layer. The user has defined two logical 2 Mbit/s frame connections in the logical layer (41), forming one protected connection. Let's assume that the layer below the logical layer illustrates transmission line systems, and correspondingly the transmission line systems layer is above the layer illustrating physical connections. When routing the transmission line systems into the physical connections, the requirements from the logical layers have to be taken into account. To simplify this example, let's assume that the topology of the transmission line systems is the same as the topology of the physical connections (42). The layer illustrating physical connections shows two separate connections, as it should.

As mentioned before, the routing order is from bottom to top. The already routed layers below are taken into account when routing a specific layer into the next layer below. Being already routed the layer below can contain information of unprotected, reliable, and protected links, which are marked into the topology of the layer. It is also known from the layers below where protection switches can be put. Now, a sublayer is formed for helping forming of the protected routes. All the nodes from the layer below and the edges which have been marked to be reliable or protected (these edges are not needed to be protected again) are taken into the sublayer. It is known where protection switches can be placed in the layer below, and by using this information new edges, called protection edges, are placed between nodes where protection switches can be placed. In other words, the protection edge represents a network section, through which two separate connections can go. Two separate connections for each protection edge are found from the layer below. Now, the layer under routing can be routed into the sublayer in a way that finding a single route represents finding a protected route.

Figure 5:
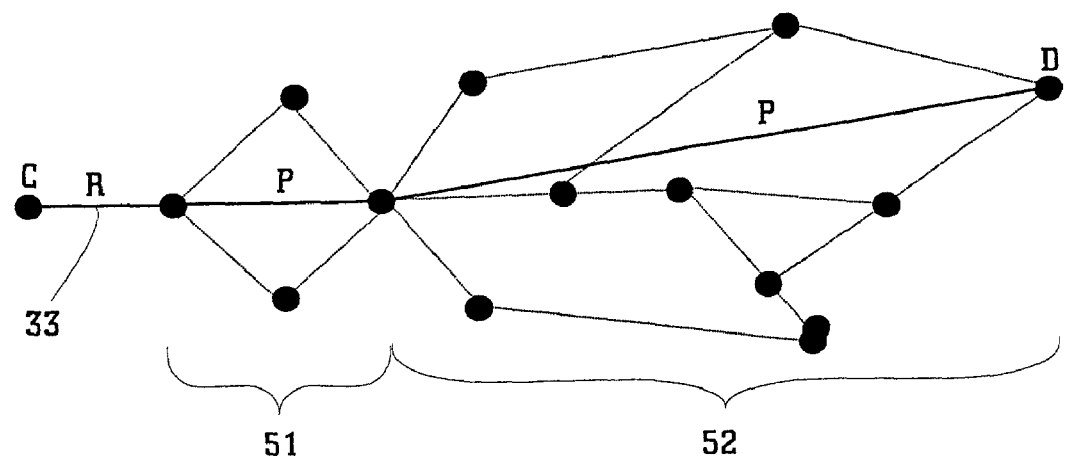
FIG. 5 shows an example of how to use a sublayer.

FIG. 5 shows an example of how to use a sublayer. The network below is the same as the network in FIG. 3, and it's edges have been marked in dashed lines. The path (33) has been marked to be reliable. For reasons of simplicity, only two sections (51, 52) where protection edges (P) have been placed are presented. Each protection edge represents two separate connections in the layer below. The separate connections are found in the way described above. It is worth noting that it is not necessary to find all nodes where the protection switches can be placed, but the direction of the connection can be taken into account when choosing the suitable nodes.

Figure 6:
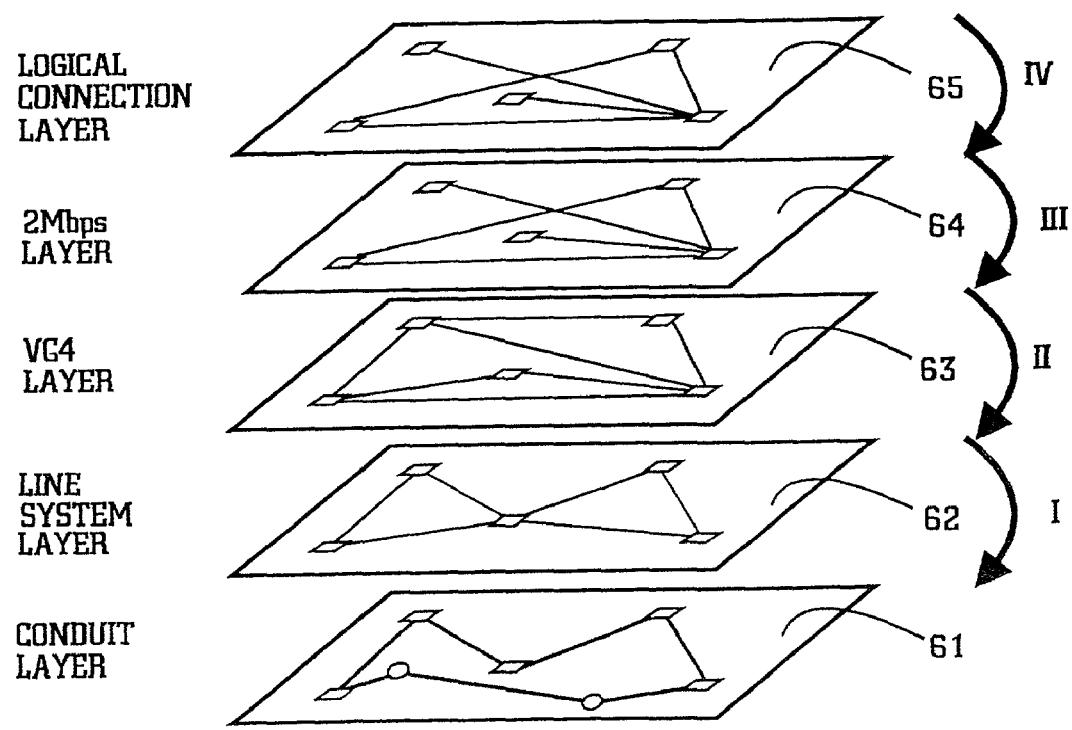
FIG. 6 illustrates an example of a routing process concerning a communication network divided into five layers on top of one another, each layer representing a specific task area of the network.
Figure 7:
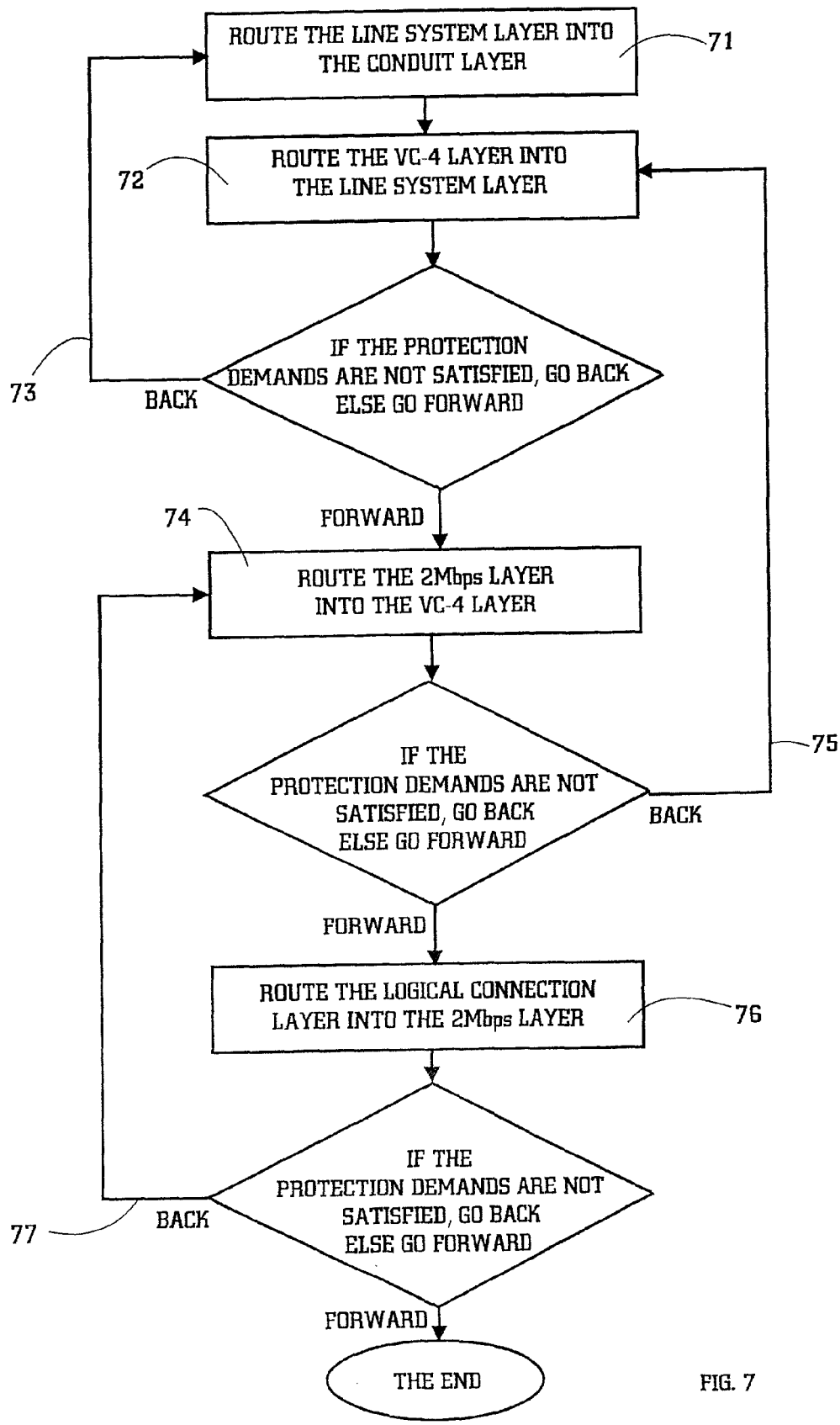
FIG. 7 shows the process of FIG. 6 in a flow chart.

FIG. 6 illustrates an example of a routing process concerning a communication network divided into five layers on top of one another, each layer representing a specific task area of the network. FIG. 7 shows the same example in a flow chart.

The bottom layer (61), i.e. the conduit layer, which describes physical conduits and nodes of the network is the foundation for all protected routes. There should be two physically different connections for the protected links (links in the above layers, which have marked to be protected) in this layer. The routing order is from bottom to top. First, the first layer (62), i.e. the line system layer (which describes physical routes and nodes in more detail), above the bottom layer, is routed (I, 71) into the bottom layer. The links which do not need protection can be routed in the shortest path. The links which need protection are routed in a way (described above) that there exist two, as short as possible, separate paths. It is worth noting that two separate routes can actually contain route sections, which are common for both routes, such as FIGS. 3A and 3B illustrates where the bath (33) forms a common route section. Protection demands are in the links, in the first layer above the bottom layer.

Second, the second layer (63), which describes VC-4 connections, above the first layer is routed (II, 72) into the first layer above the bottom layer. The links which do not need protection (the reliable sections or those protected in the first routing phase (I, 71) can be routed in the shortest path. The links which need protection are routed in a way (described above) that there exist two, as short as possible, separate paths. Protection demands are in the links, in the second layer above the bottom layer.

The first routing from the first layer to the bottom layer has to be taken into account for separating already protected routes in the first layer from the unprotected routes by using the sublayer. If the routing from the second layer to the first layer fails to satisfy protection demands totally or partly, the routing (I, 71) from the first layer to the bottom layer can be corrected (73) by taking into account the demands, which are known in more detail now, of the second layer.

The initial demands have been made when the layer has been formed. The routing brings out new demands. The demands are marked in the links, i.e. they are link specific. A demand can be that a link must have a different route than another link has in the layer below. So, these links has to be kept totally separate in the layer below. This type of demand is called a disjointness requirement. A link can contain several disjointness requirements, i.e. it must be kept totally separate from several other links in the layer below. A typical situation is that a loop of links in a layer is desired to route into layer below in a way that the loop structure remains in the selected routes. FIG. 4 illustrates the situation. Link L3 contains the disjointness requirements for keeping separate routes comparing the routes of links L1 and L2.

Disjointness requirements can be compulsory or optional. The optional requirements are divided into several categories of importance, i.e. how compulsory an individual requirement is. Usually, optional requirements are improved when the routing is corrected. Disjointness requirements concerns only the links which do not need protection. Disjointness requirements can be come from the layers above. For example, when the link is initially marked to be protected in the layer above.

When correcting (based on optional disjointness requirements) the routing, all routes are fixed, but not the one which is desired to correct. After the fixing, the weights of links, which is desired to keep separate from the link whose route is not fixed, are increased (in this case the disjointness requirement of a specific link pair contain a specific penalty weight if the disjointness requirement fails to be satisfied). After increasing the weights, a new shortest route is found for the link. The correction of the routing can be repeated until the last found route is no better than the route found before. It is worth noting that the routing arrangement (such as software) is normally capable to find new routes for several links, which fail to satisfy disjointness requirements, parallel. It is worth noting that normally compulsory disjointness requirements can be assumed to be satisfied.

After the repeated routing from the first to the bottom layer, the routing from the second to the first layer can be corrected. The layers below must rerouted before the layer under review can be routed. This iteration can be done several times.

Third, the third layer (64) above bottom layer, which describes 2 Mbit/s frame connections, is routed (III, 74) into the second layer above the bottom layer. The links which do not need protection can be routed in the shortest path. The links which need protection are routed in a way (described above) that there exist two, as short as possible, separate paths. Protection demands are in the links, in the third layer above the bottom layer. The second routing from the second layer to the first layer and the first routing from the first layer to the bottom layer have to be taken into account for separating already protected routes in the first and second layers from the unprotected routes.

If the routing (III, 74) from the third layer to the second layer fails to satisfy protection demands totally or partly, the routing from the second layer to the first layer can be corrected (75) by taking into account the demands, which are known in more detail now, of the third layer. And if needed, the routing from the first layer to the bottom layer can be corrected (73) as well. In other words, the already routed layers below can be routed again, if needed. After the repeated routings in the layers below, the routing from the third to the second layer can be corrected. This iteration can be done several times.

Finally, the top layer (65), which describes logical connections of the network, is routed (IV, 76) into the third layer above the bottom layer. The links which do not need protection (the reliable sections or those protected in the third routing phase (III, 74)) can be routed in the shortest path. The links which need protection are routed in a way (described above) that there exist two, as short as possible, separate paths. Demands for the protected route sections come from the top layer. The before-made routings (I, 71; II, 72; III, 74) have to be taken into account for separating already protected routes from the unprotected routes.

If the routing (IV, 76) from the top layer to the third layer fails to satisfy protection demands totally or partly, the routing from the third layer to the second layer can be corrected (77) by taking into account the demands, which are known in more detail now, of the top layer. And if needed, the routing from the second layer to the first layer and the routing from the first layer to the bottom layer can be corrected (75, 73) as well. In other words, the already routed layers below can be routed again, if needed. After the repeated routings in the layers below, the routing from the top to the third layer can be corrected. This iteration can be done several times. In that way it is possible to find protected routes from the top layer down to the bottom layer.

Another order for correcting routings in the layers below is that the corrective routings are started from the bottom layer. For example, the loops 75 and 77 are connected to the phase 71 in FIG. 7.

By using the inventive method, it is possible to find protected routes for all desired connections through all different layers of the network. The inventive way does not include heavy and complicated calculation. The user has great opportunities to modify the whole routing process. Thus the invention is not restricted to the description above, but it can be applied to the other modifications in the scope of the inventive idea.

The invention claimed is:

1. A method for forming protected routes, the method comprising:

routing several functional layers from bottom to up in a way that the layer under formation is routed into the layer below the layer under formation, starting from the layer above the bottom layer, and finishing when the top layer is routed into the layer below the top layer, each routing in turn taking into account protection demands, and taking into account the routing possibilities in the layer below, wherein each route includes two separate paths in a communications network, which network includes several functional layers on top of one another, each layer forming demands for protected routes in the layers below, wherein after each routing of the layer under formation, the protection demands are assessed and the routings of the layers below are changed in a way that the first below layer is routed first again, and the second below layer is routed second, wherein the routing is continued until there is no need to route again and the protection demands are met.

2. A method according to claim 1, wherein the taking of the demands into account further comprises taking into account the demands from the layer under formation and from the layers above the layer under formation.

3. A method according to claim 1, wherein the routing under formation further comprises:

finding the two shortest routes from the all route candidates, each route formed by transmission lines one after the other, each transmission line having a weight describing the length of the transmission line, and all transmission lines to marked as unprotected, reliable, or protected, fixing one of the found routes, calculating new weights for the transmission lines which are common to both the found routes by adding a penalty weight to the weights of the common transmission lines, finding a new shortest route for the route which is not fixed, repeating the step of calculating new weights and the steps of finding a new shortest route until the last route found is no better than the route found before.

4. A method according to claim 2, wherein taking into account the routing possibilities in the layer below further comprises forming a sublayer which describes possibilities for protected routes, the forming comprising:

taking all nodes from the layer below the layer under formation into the sublayer, taking reliable and protected transmission lines from the layer below the layer under formation into the sublayer, forming a new transmission line between each pair of the nodes where can be found two separate routes in the layer below the layer under formation, using the sublayer when routing the layer under formation in a way that the sublayer represents the layer below the layer under formation.

5. A method according to claim 1, wherein the taking of the demands into account further comprises taking into account the demands from the layer under formation and from the layers above the layer under formation, and changing the routing under formation comprises:

fixing all existing routes except the route which is desired to change, calculating, for the transmission lines, which are desired to keep separate from the transmission line whose route is desired to change, each transmission line having a weight describing the length of the transmission line, new weights, by adding a penalty weight to the weights of the transmission lines, which are desired to keep separate, finding a new shortest route for the link whose route is not fixed, repeating each of the previous steps until the last route found is no better than the route found before.

6. A network device configured to form protected routes, the device comprising:

routing unit configured to route several functional layers from bottom to up in a way that the layer under formation is routed into the layer below the layer under formation, starting from the layer above the bottom layer, and finishing when the top layer is routed into the layer below the top layer, each routing in turn taking into account protection demands, and taking into account the routing possibilities in the layer below, wherein each route includes two separate paths in a communications network, which network includes several functional layers on top of one another, each layer forming demands for protected routes in the layers below, and a protection unit, configured such that wherein after each routing of the layer under formation, the protection demands are assessed and the routings of the layers below are changed in a way that the first below layer is routed first again, and the second below layer is routed second, wherein the routing is continued until there is no need to route again and the protection demands are met.

7. The network device according to claim 6, wherein the routing unit is further configured to take into account the demands from the layer under formation and from the layers above the layer under formation.

8. The network device according to claim 6, wherein the routing unit is further configured to:

find the two shortest routes from the all route candidates, each route formed by transmission lines one after the other, each transmission line having a weight describing the length of the transmission line, and all transmission lines to marked as unprotected, reliable, or protected;

fix one of the found routes;

calculate new weights for the transmission lines which are common to both the found routes by adding a penalty weight to the weights of the common transmission lines, find a new shortest route for the route which is not fixed; and repeat the calculation of new weights and finding a new shortest route until the last route found is no better than the route found before.

9. The network device according to claim 7, wherein the routing unit is further configured to take into account the routing possibilities in the layer below further and includes forming a sublayer which describes possibilities for protected routes, the routing unit being configured to:

take all nodes from the layer below the layer under formation into the sublayer;

take reliable and protected transmission lines from the layer below the layer under formation into the sublayer;

form a new transmission line between each pair of the nodes where can be found two separate routes in the layer below the layer under formation; and use the sublayer when routing the layer under formation in a way that the sublayer represents the layer below the layer under formation.

10. The network device according to claim 6, wherein the routing unit is further configured to:
- taking into account the demands from the layer under formation and from the layers above the layer under formation, and change the routing under formation:
- fix all existing routes except the route which is desired to change;
- calculate for the transmission lines, which are desired to keep separate from the transmission line whose route is desired to change, each transmission line having a weight describing the length of the transmission line, new weights, by adding a penalty weight to the weights of the transmission lines, which are desired to keep separate;
- find a new shortest route for the link whose route is not fixed; and
- repeat each of the previous steps until the last route found is no better than the route found before.

* * * * *